April 24, 1962     H. J. LONDON     3,030,673
MULTIPLE GLASS SHEET GLAZING UNIT
Filed Dec. 26, 1957
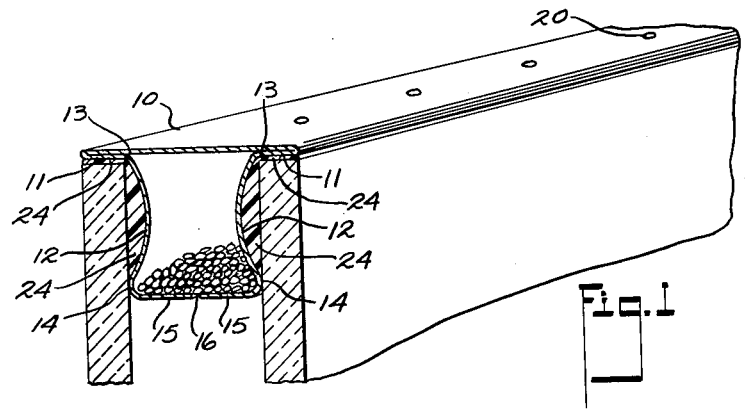
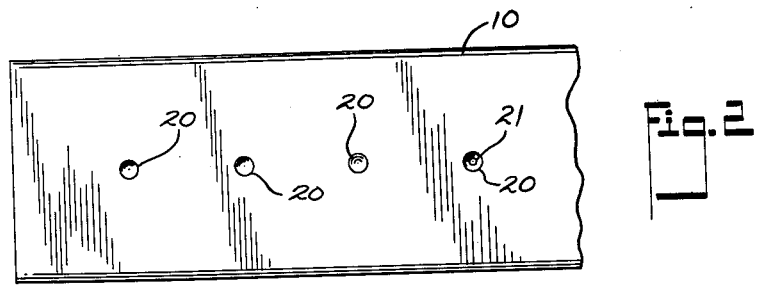
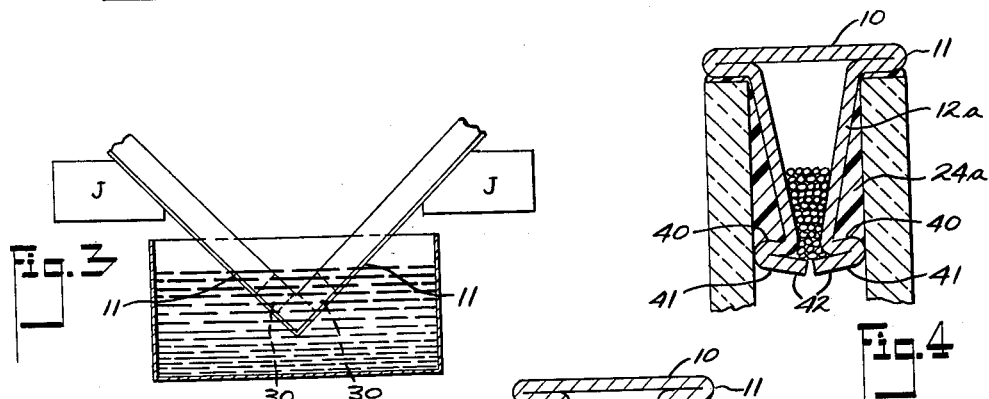
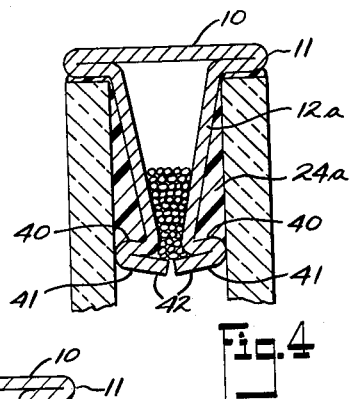
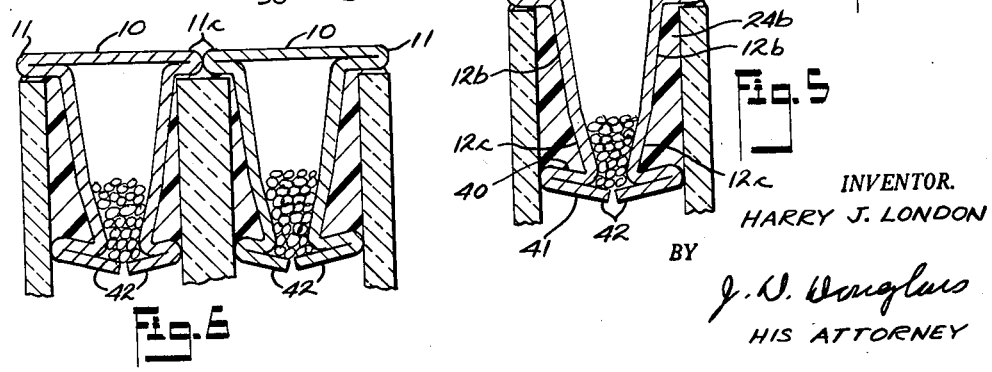
INVENTOR.
HARRY J. LONDON
BY
J. V. Douglas
HIS ATTORNEY

United States Patent Office 3,030,673
Patented Apr. 24, 1962

3,030,673
MULTIPLE GLASS SHEET GLAZING UNIT
Harry J. London, 13800 Shaker Blvd., Cleveland, Ohio
Filed Dec. 26, 1957, Ser. No. 705,390
5 Claims. (Cl. 20—56.5)

The invention relates to multiple pane window constructions and more particularly to an improved means for holding a pair of glass sheets in sealed and spaced relation to each other.

As is well known to those versed in the art, a great many multiple pane glazing units have been proposed which have had many deficiencies that the present invention overcomes.

One of the disadvantages of the prior devices was the inability to eliminate the ingress of moisture and to remove moisture economically. Another disadvantage resided in the fact that the binding frames for the glass were bulky and cumbersome, increasing the difficulty of installation. The bulk was materially increased when more than two sheets of glass were secured in position.

Furthermore the prior constructions were very difficult and expensive to manufacture making the cost so high as to militate against their use by many consumers.

By the present invention I am able to make a multiple pane window construction much cheaper than was heretofore thought possible. In addition I am able to provide one where the frame is narrow at the edges of the glass and is therefore not unsightly as in prior devices. The thickness of the frame is such that the glazing operation is very simple. Furthermore, the width of the frame is such that the glazing operation, when used in a window sash, normally conceals the frame and does not detract from the appearance of the installation.

By my improved construction I am able to easily eliminate the moisture ordinarily between the glass sheets and to provide means that is cheap and economical for assuring that the space between the sheets will remain free of moisture.

Still other advantages of the invention and the invention itself will become more apparent from the following description of some embodiments thereof which are illustrated in the accompanying drawings and forms a part of this specification.

In the drawings:

FIG. 1 is an enlarged fragmentary perspective view of the window of my invention illustrating the manner of assembly of the frame with a pair of glass sheets;

FIG. 2 is an enlarged fragmentary top edge view of the assembly;

FIG. 3 is a diagrammatic view showing the corner of the window assembly during one stage of its construction;

FIG. 4 is an enlarged fragmentary vertical section illustrating a modified form of frame section;

FIG. 5 is an enlarged fragmentary vertical section of another form of frame section; and FIG. 6 is an enlarged view showing my invention applied to a triple sheet pane.

Briefly, the invention contemplates a frame having a separator portion for holding the sheets of glass in spaced relation to each other, the separator portion being flanked by edge flanges which may engage with the edges of the glass. The separator portion also acts as a container, which opens to the space between the glass sheets, for holding a desiccant. The use of a desiccant, although not imperative, eliminates the effect of any residual moisture that is not normally eliminated during the assembly process.

More particularly a greater economy is realized because each side frame, the ends of which are mitered to make a complete frame, may be made of a single strip of metal.

As best shown in FIG. 1, the frame comprises a flat base portion 10, the opposite edges of which are bent back upon themselves as at 11, to provide glass supporting flanges. These flanges may vary in width and be of the same width or ordinarily wider than the thickness of the glass. The inwardly bent portions of the flange merge with a pair of downwardly extending inwardly bowed portions 12 the upper portion 13 of which comes into close proximity to the inner corner edges of the glass sheet and the lower portion 14 of which preferably has an edge contact with the glass. Although the parts 13 and 14 may, in some instances, contact with the glass it is preferred that, as will later appear, a sealing and holding compound 24 will be disposed between the flange 11 and part 13 and the glass. At the lower extremities of the bowed portion, the strip is provided with a pair of inwardly extending flanges 15, that extend toward each other but terminate in closely spaced relation to provide a slight gap 16. This gap should be relatively small but at the same time be sufficiently large that a circulation of air into the hollow part or chamber 17 may be realized in order that a desiccant, such as silica gel, disposed in the chamber 17, be effective to get rid of any residual moisture remaining after the assembly process.

The upper surface of the base 10 is provided with one or more inwardly extending depressions 20, disposed in spaced relation along the surfaces. The number and form of the depressions may vary, the purpose being to enable one of them, preferably when in the mid portion, to be drilled, as indicated at 21, to permit the egress of air during the assembly operation and subsequently to be soldered shut to seal the chamber off. The depressed formation assures that the solder may effect a seal and still not project above the surrounding surface beyond the depression and provide irregularities that would interfere with the mounting of the frame in a sash.

The space between the concave walls 12 of the separator and the glass is filled with a material which will cause the parts to adhere to each other and prevent the ingress of moisture, such as material may be a suitable thermo-setting compound 24 which will adhere to the glass as well as to the surface of the separator and provide an effective seal. Preferably the compound also extends around the corner 13 and under the flange 11, thus slightly separating the glass from the metal strip and providing an effective glass to metal hermetic seal against the ingress of air or moisture.

The strip described may be made by extrusion or by roll forming and the metal can be steel plated with a non-corrosive material such as tin, zinc., etc., stainless steel, ordinary steel, copper or aluminum. In some instances, it may be desirable to make the metal of an alloy having the same co-efficient of expansion as the glass sheets. The frames illustrated in the drawings are approximately four to six times the normal size.

Preferably the frames and glass are assembled in the following manner. The frames are cut to provide a mitered corner joint, which in the case of a rectangular frame would be 45°. At least one hole 21 is drilled in one of the depressions, usually midway between the ends of the frame. A small quantity of silica gel is placed in each section of frame and then fusible plugs 30 of solder, FIG. 3, are inserted in each end adjacent the miter. The plugs hold the silica gel in the chamber. The sections of frame are then assembled and supported in a suitable jig, of which two members are illustrated diagrammatically at J. The corners are then dipped in a suitable solder flux. The jig is then lowered over a solder pot, or a solder pot raised under the frame as indicated diagrammatically at S. The solder pot should have therein molten solder the melting point of which is slightly higher than that of the plugs 30. The corner of the frame is immersed in the solder to a point above or at least coextensive with the plugs 30 and held therein until the plugs melt and run down into the corner. Experiment will determine the length of time the frame needs to be emersed. The frame is then removed and allowed to cool. The corner thus formed is provided with a solid solder seal which fills the mitered corners completely, not only sealing the corners but holding the frame together at these points, with a thin coating or tinning of solder on the outside of the joint.

After soldering a thermo-setting sealing compound is placed in the concavity, with a thin coating under the flange 11, and the sheets of glass set in place and pressed firmly home. The amount of cement should be carefully controlled so that there is no great excess. However, should there be an excess the bottom of the separator is normally arranged so that the points 14 at the bottom contact with the glass, the gap 16 being slightly wider at this time. As the sheets of glass are pressed in place the cement first fills the concavity and then extrudes outwardly under the flange 11 toward the edge. Sufficient cement should be used so that this action occurs. After the sheets are pressed home, the excess cement can be removed from the glass and the flange. The frame, with the glass sheets, is then placed in a heating chamber or oven and heated to the point and for the length of time necessary to cause the cement to take a permanent set.

After the cement has set, the frame with its glass in place is removed from the oven and immediately a drop of solder applied over the vent hole 21. Capillary attraction along with the increasing vacuum due to cooling, will cause the solder to enter well into the hole. The amount of solder used should be enough to fill the hole, and partially fill, or even completely fill, the depressions but should not extend above the surrounding surface. Should it project above the surface, being of a relatively soft material, it can be cut off level with the surface.

It should be noted that the operations are all such as to provide a more desirable end product. The heating causes the expansion of the air and the driving out of the moisture. It also acts as a rejuvenant for the silica gel, due to the heat, and drives out preliminarily such moisture as it may have taken up. The soldered miter joint helps to hold the frame in position during the installation of the glass. The final heating to set the cement provides a state of reduced atmospheric pressure between the panes. Even the shape of the frame with its separator member is such as to facilitate the assembly of the product since the form makes it stiff and easy to handle. The finished product has the glass flush with the flange on the frame and therefore the glass is not held by the metal on both sides. Since the metal is largely insulated from the glass, there is less tendency for the metal to add heat to or to subtract heat from the glass in localized zones along the edge, thus preventing cracking even under most adverse changes in temperature.

The exact shape of the frame with its separator member may vary widely from that shown so long as the basic concepts are incorporated. Basically, this includes the flanges for framing the edges of the glass without clamping the sides, and the separator having the toes or feet for engagement with the glass interiorly between the panes and forming a ducted enclosure for holding the desiccant.

FIG. 4 shows a modification where the sides 12a of the separator portion are substantially flat and incline toward each other in the inward direction, and, the lower portion is provided with an outwardly and slightly upwarding extending part 40, which is bent back upon itself at 41 and provided with lips 42 which extend in closely spaced relation to each other as in the previous embodiment. This provides a generally triangular space 24a between the frame and the glass of considerably greater volume, allowing a much heavier application of the cement or sealer. It will be noted that the parts 40 which incline upwardly, provide pockets or troughs that resist the displacement of the cement compound inwardly of the frame. As in the previous embodiments, the upper ends of the legs of the separator are positioned so that they are in close proximity to the glass.

In FIG. 5 I have shown another modification closely allied to that of FIG. 4. In this instance, the flanges 11 are somewhat wider than the previous embodiment, the wall 12b inclines downwardly at one angle (which may be 8°) and then at 12c inclines at a steeper angle for the remainder of the distance (this angle may be 14°). Again, an enlarged pocket for the cement is provided at 24b, but a greater thickness of cement is provided toward the top than in the previous embodiments and the legs of the separator are well away from the glass at their upper ends. Likewise the foot 40 provides a trough or pocket for greater holding power with the cement, and is adapted to engage with the glass and prevent the cement from extending beyond it.

FIG. 6 illustrated how with a slight modification, the frames can be made for a triple sheet window. In this instance the frames are identical in construction to those of FIG. 5 except that the flanges 11c are made sufficiently narrow, that they only cover one half of the edge of the center glass. The formation of the frame of FIG. 5 lends itself particularly well to this type of construction since the greater space for cement at the upper portion is provided.

It should be noted that the same type of frame member, where one flange is wider than the other, lends itself particularly well to unit constructions where one sheet of glass is thicker than the other by design.

Having thus described my invention in some embodiments thereof I am aware that numerous and extensive departures may be made therefrom without departing from the spirit or scope of the invention as defined in the appended claims.

I claim:

1. A multiple pane window structure including means for holding two or more sheets of glass in predetermined spaced parallel relation to each other and for sealing off the space between said sheets comprising a frame having a flat base portion, a pair of flanges formed by a backwardly bent part on each side of the base, said backwardly bent parts terminating in predetermined spaced relation to each other a distance for determining the spacing between the sheets of glass, a separator portion extending from the termination of said backwardly bent parts and comprising a pair of leg portions extending inwardly of the glass edge and in spaced relation from the inner side of the glass and each other, a pair of outwardly extending glass engaging flanges on the ends of said legs formed by bending the material outward.

2. A window as described in claim 1, wherein said last mentioned flanges are provided with a portion bent backward toward each other to provide a pocket therebetween.

3. A frame as defined in claim 2, each side portion of which is mitered to provide corners at the corners of said glass and meltable sealing means having a melting point below that of the frame portions is provided in said pockets at the corners to seal the same.

4. A device as described in claim 1, wherein a sealing compound is disposed in the space between the glass and the inwardly extending portions and under the flanges.

5. A multiple pane window structure comprising a frame having an outer portion providing a back member having edge portions turned back upon itself to provide flanges for supporting a pair of glass sheets, said flanges extending from the inner edges of the glass sheets and terminating at the outer edges thereof, the inner edges of said back turned portions extend inwardly between the glass sheets to provide a pair of walls which are spaced from the sides of the glass sheets and from each other, said walls inclining toward each other in the direction inwardly of the glass sheets, said walls terminating in outwardly extending flanges which are inclined upwardly toward the back member by bending the material outward and upwardly and then back upon itself, said backwardly bent portion extending inwardly of said wall and terminating in edges disposed in closely spaced relation to each other to provide a chamber between the walls for holding a desiccant, said space between the walls and the glass sheets being filled with a thermo-setting material for sealing the glass sheets to the frame.

References Cited in the file of this patent

UNITED STATES PATENTS

| | | |
|---|---|---|
| 2,621,397 | Black | Dec. 16, 1952 |
| 2,639,769 | Krantz | May 26, 1953 |
| 2,703,159 | Van Fleet | Mar. 1, 1955 |
| 2,708,774 | Seelen | May 24, 1955 |
| 2,746,102 | Englehart et al. | May 22, 1956 |
| 2,775,028 | Wampler | Dec. 25, 1956 |

FOREIGN PATENTS

| | | |
|---|---|---|
| 1,026,712 | France | Feb. 4, 1953 |
| 1,079,389 | France | Mar. 19, 1954 |
| 1,136,914 | France | Jan. 7, 1957 |